No. 878,546. PATENTED FEB. 11, 1908.
J. H. LYON.
HOUSE TRUCK.
APPLICATION FILED JULY 12, 1907.
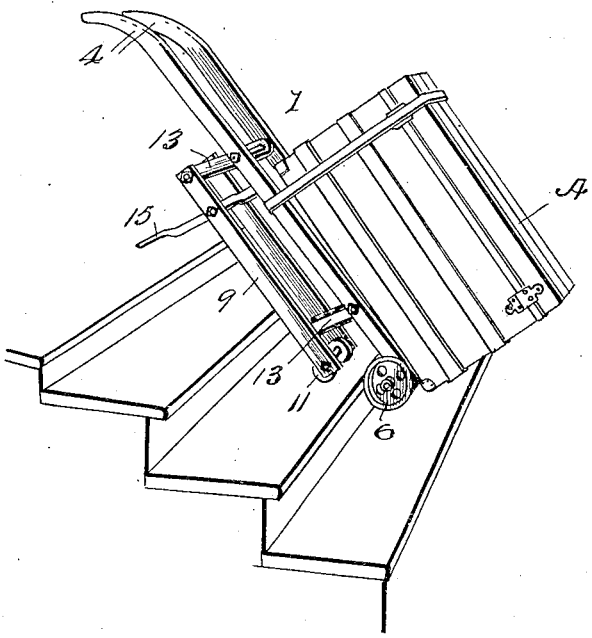
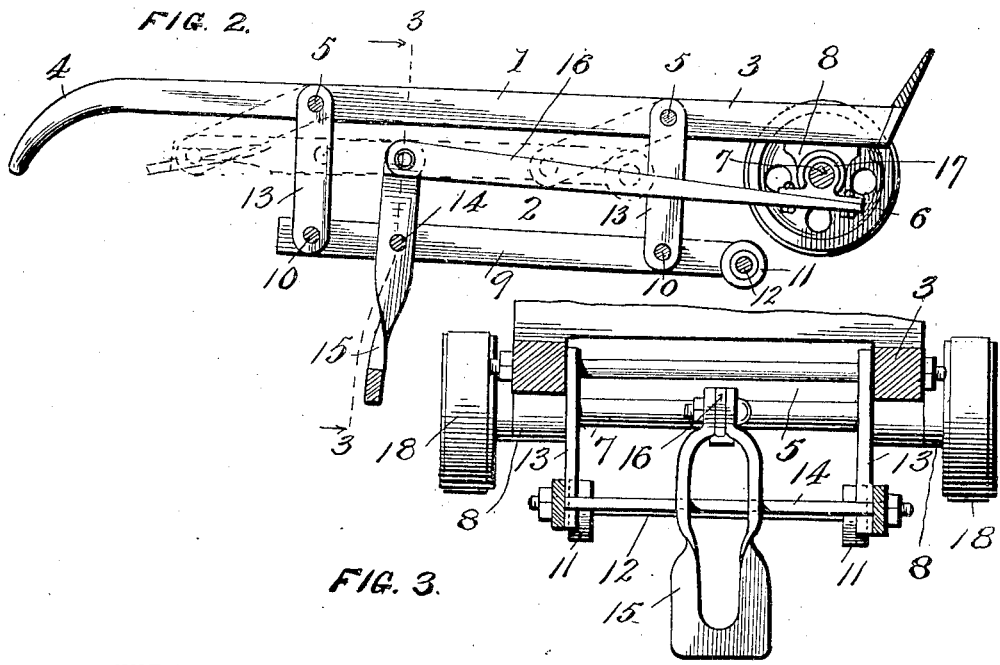
WITNESSES
INVENTOR

UNITED STATES PATENT OFFICE.

JUSTUS H. LYON, OF KEARNEY, NEBRASKA.

HOUSE-TRUCK.

No. 878,546.　　　Specification of Letters Patent.　　　Patented Feb. 11, 1908.

Application filed July 12, 1907. Serial No. 383,501.

*To all whom it may concern:*

Be it known that I, JUSTUS H. LYON, a citizen of the United States, residing at Kearney, in the county of Buffalo and State of Nebraska, have invented certain new and useful Improvements in House-Trucks, of which the following is a specification.

My invention relates to trucks and particularly contemplates the provision of a simple and inexpensive structure designed for use within a home to more readily and easily carry trunks and other weighty structures up the stairs without damaging the same.

My invention further and specifically resides in the following features of construction arrangement and operation as may be hereinafter described with reference to the accompanying drawings forming a part of this specification, in which like numerals are used to designate like parts throughout the several figures, and in which, Figure 1 is a perspective view illustrating the practical application of my invention, Fig. 2 is a central longitudinal sectional view through my improved truck, and Fig. 3 is a transverse sectional view taken therethrough on the line 3—3 of Fig. 2.

In the practical embodiment of my invention I provide a house truck comprising a main frame 1 and a supplemental frame 2. The main frame 1 comprises the longitudinal side beams 3 having curved handles 4 formed at their rear ends, said beams 3 being spaced apart by transverse rods 5 and having wheels 6 mounted upon a transverse axle 7 journaled in brackets 8 at the forward ends thereof. The main frame 1, as shown and described constitutes a truck such as is ordinarily used in transporting weighty structures and articles from place to place.

The supplemental frame 2 is arranged below the main frame 1 and comprises side beams 9 spaced apart and supported by transverse rods 10 and having wheels 11 mounted upon a transverse axle 12 extending between said side beams 9. The supplemental frame 2 is pivotally connected to the main frame 1 by means of connecting beams 13 having openings adjacent both ends thereof through which the transverse supporting rods 5 and 10 of their respective frames 1 and 2 are loosely disposed, thus providing a swinging movable connection between said frames as is clearly shown. The supplemental frame 2 is further provided with a transverse supporting rod 14 arranged between the side beams 9 thereof and forming the pivot of an operating foot lever 15, comprising a U shaped frame having the free ends of its legs pivotally connected to an operating rod 16 arranged between said frames 1 and 2 and connected and integrally united at its forward end, the collar 17 loosely associated upon the wheel axle 7 of the main frame 1. Thus by means of the foot lever 15 the main and supplemental frames 1 and 2 respectively may be moved upon their pivotal connections in relation to one another as desired.

In the practical embodiment of my invention a trunk or like weighty article A, desired to be carried up a flight of stairs, is suitably secured upon the main frame 1, and the frame 2 is swung rearwardly and upwardly until the rollers 11 rest upon the first step. The operator's foot is then placed upon the lever 15 to force the same downwardly and to simultaneously swing the main frame 1 upwardly by means of the operating rod 16, onto the same step, and the same operation is repeated upon each succeeding step until the floor above has been reached. The supplemental frame 2 will not, then be further used, and may be folded upwardly and rearwardly against the main frame 1 by a rearward movement of the foot lever 15, said lever 15 and the operating rod 16 being straightened out thereby and serving to support said frame 2 in its folded position.

The wheels 6 of the main frame 1 are preferably provided with flat elastic tires 18, which may also be provided upon the wheels 11 of the frame 2 if desired.

Having thus fully described my invention, I claim:

1. In a house truck, the combination of a main frame having wheels journaled at its forward end, a supplemental frame arranged below and pivotally connected to said main frame and having wheels journaled at its forward end, and a lever pivotally mounted within said frames for swinging the same with relation to one another, substantially as described.

2. In a house truck the combination of a main frame having wheels journaled at its forward end, a supplemental frame arranged below and pivotally connected to said main frame and having wheels journaled at its forward end, and a lever pivotally mounted within one of said frames and having pivotal connection with the other of said frames for swinging the same with relation to one another, substantially as described.

3. In a house truck, the combination of a main frame having wheels journaled at its forward end, a supplemental frame arranged below and pivotally connected to said main frame and provided with wheels journaled at its forward end an operating rod loosely connected at one end to a portion of said main frame and extending between said frames and a lever pivotally mounted within said supplemental frame and having pivotal connection with the end of said operating rod for swinging said frames with relation to one another, substantially as described.

4. In a house truck the combination of a main frame having wheels journaled at its forward end, a supplemental frame arranged below and pivotally connected to said main frame and having wheels journaled at its forward end, and a lever pivotally mounted within said supplemental frame and having pivotal connection with said main frame for swinging one of said frames with relation to the other, substantially as described.

In testimony whereof I affix my signature in presence of two witnesses.

JUSTUS H. LYON.

Witnesses:
C. A. ROBINSON,
JOHN WILSON.